US011730336B2

(12) United States Patent
Calimano et al.

(10) Patent No.: US 11,730,336 B2
(45) Date of Patent: *Aug. 22, 2023

(54) MULTILAYER CLEANING ARTICLE WITH GRIPPING LAYER AND DRY SURFACE CONTACT LAYER

(71) Applicant: The Clorox Company, Oakland, CA (US)

(72) Inventors: Elisa Calimano, Pleasanton, CA (US); Daniela Fritter, Dublin, CA (US); Kristina Perlas, Durham, NC (US); Jason White, Pleasanton, CA (US); Chosu Khin, Roseville, CA (US); Janiece Hope, San Ramon, CA (US); Bernard Hill, San Francisco, CA (US); Stephen Fisher, Pleasanton, CA (US); Kelly Dickson, Pleasanton, CA (US); William Ouellette, Livermore, CA (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,359

(22) Filed: Sep. 1, 2022

(65) Prior Publication Data

US 2022/0409004 A1  Dec. 29, 2022

Related U.S. Application Data

(63) Continuation of application No. 17/110,135, filed on Dec. 2, 2020, now Pat. No. 11,439,289, which is a (Continued)

(51) Int. Cl.
*A47L 13/16* (2006.01)
*B32B 1/00* (2006.01)
(Continued)

(52) U.S. Cl.
CPC ............... *A47L 13/16* (2013.01); *B32B 1/00* (2013.01); *B32B 3/26* (2013.01); *B32B 5/022* (2013.01);
(Continued)

(58) Field of Classification Search
CPC ............ A47L 13/16; B23B 5/16; C11D 17/04
See application file for complete search history.

(56) References Cited

U.S. PATENT DOCUMENTS 3,288,579 A   11/1966   Wright et al.
4,477,938 A   10/1984   Rogut
(Continued)

FOREIGN PATENT DOCUMENTS

CA   2431336 A1   12/2004
CA   2454137 A1   6/2005
(Continued)

OTHER PUBLICATIONS

Non-Final Office Action received for U.S. Appl. No. 14/970,107, dated Jun. 26, 2018.
(Continued)

*Primary Examiner* — Michael D Jennings
(74) *Attorney, Agent, or Firm* — Workman Nydegger (57) ABSTRACT

The present invention teaches multilayer cleaning articles that include a substantially dry surface contact layer and a gripping layer. The contact layer may represent one exposed major face of the cleaning article (e.g., a cleaning pad), while the gripping layer may represent the opposite exposed major face of the cleaning article. The contact layer may include abrasive synthetic fibers, so as to be effective in scrubbing soils and spills from a surface. The contact layer includes a cleaning composition pre-loaded therein. The cleaning composition is such that the contact layer feels dry to the touch prior to use, before wetting with water. The
(Continued)

cleaning composition may include about 1% to about 40% by weight water. The gripping layer includes at least 40% by weight of pulp fibers (e.g., natural cellulose pulp fiber), and exhibits a mean hand grip value that is at least 0.015 $1/\text{in}^2$ (reciprocal inches squared).

20 Claims, 4 Drawing Sheets

Related U.S. Application Data continuation of application No. 16/250,865, filed on Jan. 17, 2019, now Pat. No. 10,881,262, which is a continuation of application No. 14/970,107, filed on Dec. 15, 2015, now Pat. No. 10,219,672.

(51) Int. Cl.
  C11D 17/04 (2006.01)
  B32B 5/02 (2006.01)
  B32B 5/26 (2006.01)
  B32B 7/02 (2019.01)
  B32B 7/12 (2006.01)
  B32B 27/12 (2006.01)
  B32B 27/30 (2006.01)
  B32B 27/32 (2006.01)
  B32B 27/36 (2006.01)
  B32B 27/40 (2006.01)
  B32B 27/42 (2006.01)
  B32B 3/26 (2006.01)
  B32B 5/16 (2006.01)

(52) U.S. Cl.
  CPC ............... *B32B 5/26* (2013.01); *B32B 7/02* (2013.01); *B32B 7/12* (2013.01); *B32B 27/12* (2013.01); *B32B 27/302* (2013.01); *B32B 27/32* (2013.01); *B32B 27/36* (2013.01); *B32B 27/40* (2013.01); *B32B 27/42* (2013.01); *C11D 17/049* (2013.01); *B32B 5/16* (2013.01); *B32B 2250/02* (2013.01); *B32B 2250/04* (2013.01); *B32B 2262/02* (2013.01); *B32B 2262/023* (2013.01); *B32B 2262/0253* (2013.01); *B32B 2262/0276* (2013.01); *B32B 2262/0284* (2013.01); *B32B 2262/0292* (2013.01); *B32B 2262/062* (2013.01); *B32B 2262/14* (2013.01); *B32B 2307/402* (2013.01); *B32B 2307/7265* (2013.01); *B32B 2307/732* (2013.01); *B32B 2432/00* (2013.01)

(56) References Cited

U.S. PATENT DOCUMENTS

| | | | |
|---|---|---|---|
| 4,780,361 A * | 10/1988 | Schlein | B32B 23/10 428/317.1 |
| 5,782,409 A * | 7/1998 | Paul | A61L 9/12 428/905 |
| 5,980,931 A | 11/1999 | Fowler et al. | |
| 6,267,975 B1 * | 7/2001 | Smith, III | A61Q 19/10 424/443 |
| 6,281,178 B1 | 8/2001 | Ryklin et al. | |
| 6,322,601 B1 | 11/2001 | Semedard et al. | |
| 6,322,801 B1 * | 11/2001 | Lorenzi | B32B 5/18 424/443 |
| 6,391,835 B1 | 5/2002 | Gott et al. | |
| 6,432,904 B1 | 8/2002 | Suazon et al. | |
| 6,440,925 B1 | 8/2002 | Suazon et al. | |
| 6,489,284 B1 | 12/2002 | Suazon et al. | |
| 6,494,982 B1 | 12/2002 | Mueller et al. | |
| 6,495,151 B2 | 12/2002 | McAtee et al. | |
| 6,495,508 B1 | 12/2002 | Leonard et al. | |
| 6,525,014 B1 | 2/2003 | Gorlin et al. | |
| 6,534,472 B1 * | 3/2003 | Arvanitidou | C11D 3/2006 510/501 |
| 6,551,980 B1 | 4/2003 | Wisniewski et al. | |
| 6,586,385 B1 | 7/2003 | Wisniewski et al. | |
| 6,638,527 B2 | 10/2003 | Gott et al. | |
| 6,649,584 B2 | 11/2003 | Wisniewski et al. | |
| 6,652,869 B2 | 11/2003 | Suazon et al. | |
| 6,677,294 B2 | 1/2004 | Shaw et al. | |
| 6,680,287 B2 | 1/2004 | Wisniewski et al. | |
| 6,689,736 B2 | 2/2004 | Thomas et al. | |
| 6,730,621 B2 | 5/2004 | Gott et al. | |
| 6,734,157 B2 | 5/2004 | Radwanski et al. | |
| 6,794,353 B2 | 9/2004 | Thomas et al. | |
| 6,814,088 B2 | 11/2004 | Barnabas et al. | |
| 6,993,805 B2 * | 2/2006 | Prodoehl | A47L 17/08 15/118 |
| 7,115,535 B1 | 10/2006 | Smith et al. | |
| 7,307,055 B2 | 12/2007 | Cook et al. | |
| 7,491,438 B2 | 2/2009 | Demott et al. | |
| 7,576,047 B2 | 8/2009 | Kilkenny et al. | |
| 7,799,751 B2 | 9/2010 | Kilkenny et al. | |
| 7,833,918 B2 | 11/2010 | Gormley et al. | |
| D633,673 S | 3/2011 | McKnight | |
| 8,278,260 B2 | 10/2012 | Saint Victor | |
| 8,343,612 B2 | 1/2013 | Soeder et al. | |
| 8,357,392 B2 * | 1/2013 | Kelly | A61K 33/18 510/438 |
| 8,778,860 B2 | 7/2014 | Saint Victor | |
| 10,219,672 B2 | 3/2019 | Calimano et al. | |
| 10,881,262 B2 | 1/2021 | Calimano et al. | |
| 11,439,289 B2 | 9/2022 | Calimano et al. | |
| 2003/0143263 A1 | 7/2003 | Durden et al. | |
| 2004/0204332 A1 | 10/2004 | Dastbaz et al. | |
| 2005/0085405 A1 | 4/2005 | Shaw et al. | |
| 2005/0118916 A1 | 6/2005 | Ducker et al. | |
| 2006/0185134 A1 | 8/2006 | Carter et al. | |
| 2007/0142261 A1 | 6/2007 | Clark et al. | |
| 2007/0254546 A1 | 11/2007 | Despault | |
| 2008/0102725 A1 | 5/2008 | Lacey et al. | |
| 2009/0246240 A1 | 10/2009 | Holmberg | |
| 2010/0048072 A1 | 2/2010 | Kauschke et al. | |
| 2010/0206327 A1 | 8/2010 | Dibono et al. | |
| 2011/0045261 A1 | 2/2011 | Sellars | |
| 2011/0217895 A1 | 9/2011 | Peterson | |
| 2011/0272304 A1 | 11/2011 | Wahal et al. | |
| 2012/0119558 A1 | 5/2012 | Ichikawa et al. | |
| 2012/0145171 A1 | 6/2012 | Ananthapadmanabhan et al. | |
| 2012/0190259 A1 | 7/2012 | Frost | |
| 2012/0227203 A1 * | 9/2012 | Ouellette | A47L 13/16 15/209.1 |
| 2013/0004552 A1 | 1/2013 | Pedoja | |
| 2013/0239344 A1 | 9/2013 | Stolarz et al. | |
| 2014/0000653 A1 | 1/2014 | Sacks | |
| 2014/0093698 A1 * | 4/2014 | Perry | D04H 1/4274 442/57 |
| 2017/0164806 A1 | 6/2017 | Calimano et al. | |
| 2019/0167061 A1 | 6/2019 | Calimano et al. | |
| 2021/0085149 A1 | 3/2021 | Calimano et al. | |

FOREIGN PATENT DOCUMENTS

| | | |
|---|---|---|
| CA | 2845463 A1 | 9/2014 |
| WO | 02/94330 A1 | 11/2002 |
| WO | 2005/044177 A2 | 5/2005 |
| WO | 2012/084649 A1 | 6/2012 |

OTHER PUBLICATIONS

Non-Final Office Action received for U.S. Appl. No. 17/110,135, dated Jan. 25, 2022, 7 pages.
Non-Final Rejection received for U.S. Appl. No. 16/250,865, dated May 26, 2020, 5 pages.
Notice of Allowance received for U.S. Appl. No. 14/970,107, dated Oct. 26, 2018, 7 pages.

(56) References Cited

OTHER PUBLICATIONS

Notice of Allowance received for U.S. Appl. No. 16/250,865, dated Sep. 23, 2020, 5 pages.
Notice of Allowance received for U.S. Appl. No. 17/110,135, dated May 4, 2022, 7 pages.

* cited by examiner

MULTILAYER CLEANING ARTICLE WITH GRIPPING LAYER AND DRY SURFACE CONTACT LAYER

PRIORITY CLAIMS AND RELATED PATENT APPLICATIONS

This application is a continuation of co-pending U.S. application Ser. No. 17/110,135, filed on Dec. 2, 2020, entitled "MULTILAYER CLEANING ARTICLE WITH GRIPPING LAYER AND DRY SURFACE CONTACT LAYER", now issued as U.S. Pat. No. 11,439,289, which is a continuation of U.S. application Ser. No. 16/250,865, filed on Jan. 17, 2019, entitled "MULTILAYER CLEANING ARTICLE WITH GRIPPING LAYER AND DRY SURFACE CONTACT LAYER", now issued as U.S. Pat. No. 10,881,262, which is a continuation of U.S. patent application Ser. No. 14/970,107, filed on Dec. 15, 2015, entitled "MULTILAYER CLEANING ARTICLE WITH GRIPPING LAYER AND DRY SURFACE CONTACT LAYER", now issued as U.S. Pat. No. 10,219,672 on Mar. 5, 2019. The entire disclosure of each of the above applications is hereby incorporated by reference in their entirety.

BACKGROUND OF THE INVENTION

1. The Field of the Invention

The present invention relates to cleaning devices, particularly to devices for cleaning of hard surfaces, such as countertops, table tops, and the like.

2. Description of Related Art

Consumers routinely clean countertops, tabletops, and similar household hard surfaces using various cleaning articles and cleaning compositions. While various devices have been employed in such cleaning activities, there exists a continuing need for improved devices.

BRIEF SUMMARY

One aspect of the present invention relates to a multilayer cleaning article that may include a substantially dry surface contact layer (e.g., the layer contacting the surface to be cleaned during use) where the contact layer comprises abrasive fibers. The abrasive fibers may be selected from the group consisting of polyethylenes, polypropylenes, polyethylene terephthalate, polyesters, polystyrenes, melamines, polyurethanes, and any combinations or mixtures thereof. The surface contact layer may include a hard surface cleaning composition pre-loaded onto the abrasive fibers of the contact layer (e.g., loaded therein or thereon during manufacture). The cleaning composition (e.g., as loaded on the contact layer, so that the combination of the two is dry to the touch) may include about 10% to about 90% by weight of surfactant(s), and about 1% to about 40% by weight of water. Even with up to about 40% water, the contact layer with cleaning composition therein or thereon may exhibit touch and feel characteristics described as "dry" or "substantially dry". For example, upon touching the contact layer, the water concentration within the preloaded cleaning composition is sufficiently low so that the surface feels dry to the touch, so as to not leave any wet residue on the user's hands, gloves, clothing, and such. Because the contact layer is abrasive, the feel of the contact layer upon touching may exhibit a scratchy and dry feel.

The cleaning article may further include a gripping layer (e.g., on an exposed surface opposite the contact layer) that exhibits enhanced gripping characteristics, so as to resist any tendency of the article to slip out of a user's hands when gripped therein. The gripping layer may include a relatively high fraction (e.g., at least 40%) of pulp fibers to provide such improved grip. The mean hand grip value for the gripping layer may be at least 0.015 1/in$^2$ (units of reciprocal square inches). The parameter "hand grip value" will be described in further detail herein, and is equal to the coefficient of friction divided by the square of the palm length of a person's hand.

Such cleaning articles have been found by the present inventors to provide a cleaning article into which a cleaning composition may be pre-loaded, and which exhibit increased grip relative to the gripping layer side of the cleaning article, even in the presence of surfactants, and water (e.g., rinse water, water added to facilitate cleaning a tabletop or countertop, or similar). For example, it is beneficial to have abrasive fibers, (e.g., typically synthetic abrasive fibers) within the contact layer, so that the abrasive contact layer is better able to scrape and agitate materials that may be adhered to the hard surface being cleaned. Inclusion of the pre-loaded cleaning composition within the abrasive fiber contact layer further aids in removal of such stuck-on materials, as the cleaning composition may be activated by running water over the contact layer surface, or providing water on the tabletop or countertop being cleaned, and then contacting the contact layer with that water. Upon contact with the water, the cleaning composition is activated, e.g., beginning to foam and suds, aiding in breaking up and removing spills and soils, including those that may be "stuck on" or otherwise adhered to the surface being cleaned.

While such abrasive fiber materials are good for working loose such adhered spills and debris on a countertop or similar hard surface, such abrasive fibers do not provide an ideal gripping surface. For example, such abrasive fibers can be rough on the user's hands, and otherwise lack desired characteristics for comfortable and reliable grip. For example, when using the same or differently textured synthetic materials for the gripping side of such a cleaning article, the inventors have found that use of purely synthetic materials results in a slippery hand-feel and poor grip when scrubbing with such a pad. For example, a user will typically press into the scrubbing pad, in an attempt to scrub soils and spills, transferring the applied force from the gripping side to the abrasive side of the pad. Where the gripping side of such a pad is formed of a synthetic material, this can be difficult, as the pad will tend to slip within the user's hand(s), particularly in the presence of surfactants and/or water that may migrate from the cleaning contact layer to the opposite, gripping side.

The inventors have discovered that increased and enhanced grip results where a gripping layer is provided that includes at least 40% by weight of natural cellulose pulp fibers (e.g., pulp and/or cotton). Such relatively high pulp content aids in the ability of the user to press the pad into the surface being scrubbed, while minimizing any tendency of the pad or other cleaning article to slip within or out of the hand of the user during use. Even regenerated cellulose has been found by the present inventors to act similarly to synthetic materials, not providing the desired grip characteristics. As such, the gripping layer may include at least 40% by weight natural (as opposed to regenerated) pulp fiber.

Another embodiment of the invention is directed to a multilayer cleaning article comprising a substantially dry surface contact layer that may be pre-loaded with a hard surface cleaning composition, and which includes abrasive fibers selected from the group consisting of polyethylenes, polypropylenes, polyethylene terephthalate, polyesters, polystyrenes, melamines, polyurethanes, and any combinations or mixtures thereof. The hard surface cleaning composition may include about 10% to about 90% by weight of surfactant, and about 1% to about 40% by weight water. The multilayer cleaning article (e.g., a pad) may further include a substantially dry gripping layer including at least 40% by weight of pulp fibers (e.g., cotton and/or other natural cellulose pulp), and a mean hand grip value for the gripping layer may be at least 0.02 1/in$^2$. A moisture impermeable barrier may be provided between the gripping layer and the contact layer. Because of the presence of the barrier layer, the gripping layer may remain substantially dry, even when the contact layer (which is also initially substantially dry) is wetted with water, e.g., to better facilitate cleaning of spills or soils. Such a barrier layer may prevent migration of cleaning composition from the contact layer to the gripping layer, as the barrier layer is disposed therebetween.

Another embodiment of the invention is directed to a multilayer cleaning article consisting of a substantially dry surface contact layer, a moisture impermeable barrier layer adjacent to the dry gripping layer, optionally a loft layer (e.g., between the barrier layer and the contact layer), and a substantially dry gripping layer. The contact layer includes abrasive fibers that may be selected from the group consisting of polyethylenes, polypropylenes, polyethylene terephthalate, polyesters, polystyrenes, melamines, polyurethanes, and any combinations or mixtures thereof. The contact layer also includes a hard surface cleaning composition pre-loaded onto the abrasive fibers, which may include about 10% to about 90% by weight of surfactant, and about 1% to about 40% by weight of water. The substantially dry gripping layer includes at least 40% by weight of pulp fibers (e.g., natural cellulose pulp fibers), and has a mean hand grip value of at least 0.02 1/in$^2$.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Definitions

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

As used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or formulation process, and may include values that are within 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of the cleaning composition.

As used herein, the terms "nonwoven" or "nonwoven web" means a web having a structure of individual fibers or threads which are interlaid, but not in an identifiable manner as in a knitted web. Nonwoven webs may be formed from many processes, such as, for example, meltblowing processes, spunbonding processes, spunlace processes, airlaid processes and bonded carded web processes. The particular method for fiber lay down for layers of the present multilayer cleaning articles is not particularly limited.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to a multilayer cleaning article that includes at least a substantially dry surface contact layer, and a gripping layer. The contact layer may represent one exposed major face of the cleaning article (e.g., a cleaning pad), while the gripping layer may represent the opposite exposed major face of the cleaning article. The contact layer (e.g., that layer that contacts the surface to be cleaned during use) may include abrasive synthetic fibers, so that it will be more effective in scrubbing soils, spills, and the like which may have become adhered to the surface being cleaned (e.g., dried-on soils and spills). The contact layer including such abrasive fibers may further include a hard surface cleaning composition loaded onto the abrasive fibers. The cleaning composition is such that the preloaded contact layer still feels dry to the touch prior to use, e.g., before wetting with water. The cleaning composition may include about 10% to about 90% by weight of surfactant, and about 1% to about 40% by weight of water. The gripping layer advantageously includes at least 40% by weight of pulp fibers (e.g., natural cellulose pulp fiber), and exhibits a mean hand grip value that is at least 0.015 $1/in^2$.

The cleaning composition may be dosed onto the contact layer during manufacture and then dried. For example, the water content within the dosed cleaning composition may be somewhat higher than 40%, but upon drying, the water content drops to not more than about 40%. Of course, upon such drying, the percentage of surfactant (and any other non-volatile components) in the cleaning composition increases. Even with up to about 40% water, the contact layer with cleaning composition therein or thereon may exhibit touch and feel characteristics described as "dry" or "substantially dry". For example, upon touching the contact layer, the water concentration within the preloaded cleaning composition is sufficiently low so that the surface feels dry to the touch, so as to not leave any wet residue on the user's hands, gloves, clothing, and such. Because the contact layer is abrasive, the feel of the contact layer upon touching may exhibit a scratchy and dry feel.

The natural pulp fibers within the gripping layer provide increased grip and slip resistance to the cleaning article within the hand of a user, making the device less likely to slip out of the user's hand, or to slip within their hand, during use (e.g., while pressing the gripping layer into the surface being cleaned). The multilayer cleaning article provides better grippability and hand comfort than provided within existing scrubbing pads. This is particularly important where the thickness of the cleaning article is relatively thin (e.g., less than about 6 mm, or from about 2 mm to about 6 mm). Preferred multilayer cleaning articles may only be about 2 mm thick, where the pulp concentration characteristics of the gripping layer are quite important, as there is negligible grippability due to height or thickness of the pad. Rather, the gripping characteristics are provided by the nearly 2 dimensional gripping layer itself.

III. Exemplary Multilayer Cleaning Articles

Figure 1:
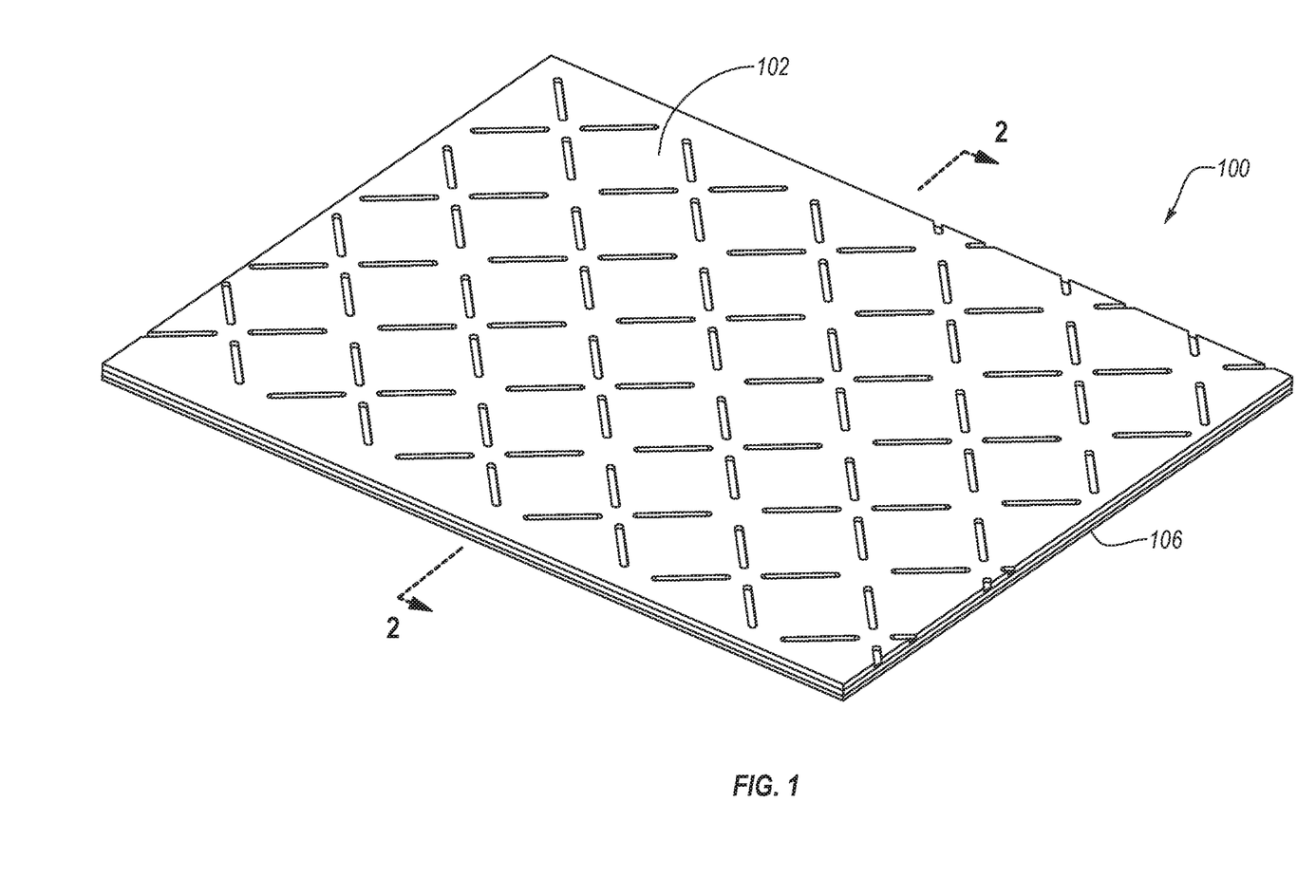
FIG. 1 is a perspective view of an exemplary multilayer cleaning article.
Figure 2:
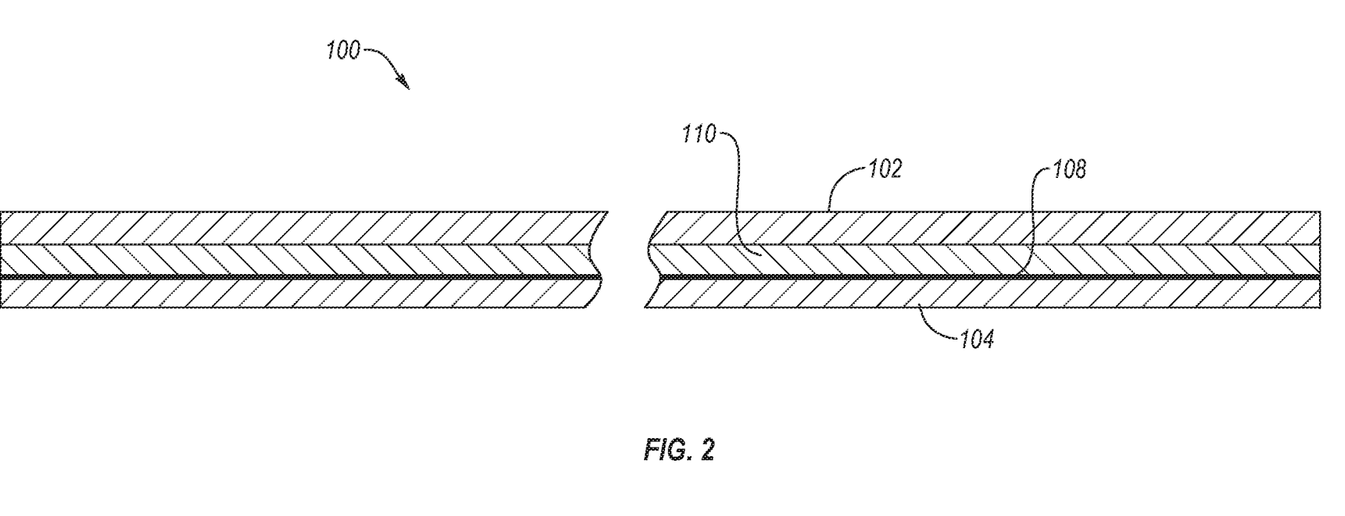
FIG. 2 is a cross-sectional view through the cleaning article of FIG. 1.

FIGS. 1-2 show an exemplary multilayer cleaning article 100 configured as a generally planar cleaning or scrubbing pad. Cleaning article 100 advantageously includes a plurality of layers, where at least one of the layers is differently configured from another layer. For example, FIG. 2 shows a cross-sectional view of cleaning article 100, illustrating how it may include a contact layer 102, and a gripping layer 104. As seen in FIGS. 1-2, the contact layer 102 may form one of the major exposed planar faces (e.g., the bottom face during use) of the cleaning article 100, with gripping layer 104 forming an opposite exposed major planar face (e.g., the top face during use) of article 100. Other layers which may optionally be present within the cleaning article may be sandwiched between layers 102 and 104, so that they are exposed only along the sides 106, if at all.

Contact layer 102 may be that side or face of the cleaning article that is used in cleaning the desired surface (e.g., a hard surface such as a countertop, tabletop, cupboards, walls, floors, and the like). Contact layer 102 may be specifically configured for this purpose. For example, it may be formed from or otherwise include abrasive fibers that would aid the contact layer in scrubbing spills and soils from desired surfaces, e.g., with the aid of a cleaning composition, which may typically be accompanied by activating rinse water added by the user. The contact layer may thus be relatively abrasive, particularly well-suited for scrubbing even dried-on spills and soils from the hard surface being cleaned. The abrasive fibers are typically not so abrasive as to damage the tabletop or countertop, but may typically comprise synthetic fibers. Examples of such include, but may not be limited to polyethylenes, polypropylenes, polyethylene terephthalate, polyesters, polystyrenes, melamines, polyurethanes, and any combinations or mixtures thereof. The particular denier and other characteristics of the abrasive fibers may be configured to provide the desired abrasive, scratchy-feel characteristics.

As shown in FIG. 1, the contact layer 102 may include a pattern formed therein (e.g., as a result of sonic bonding). Gripping layer 104 may also include a pattern formed therein, e.g., from the same sonic bonding. For example, the illustrated pattern may include a repeating diamond or chevron pattern. Such is further illustrated in U.S. Design application Ser. No. 29/498,196, herein incorporated by reference.

The contact layer may advantageously have a hard surface cleaning composition loaded onto the abrasive fibers of the contact layer, such that the cleaning article 100 as provided by the manufacturer is ready for use, without any need for the user to add a cleaning composition to the surface of contact layer 102 themselves. In addition, the cleaning composition preloaded within the contact layer is advantageously formulated so that the contact layer 102 exhibits a dry to the touch feel, even where the cleaning composition itself includes some relatively low concentration of water therein.

For example, the cleaning composition may be a composition including a surfactant and water. The water may be included in an amount from about 1% to about 40% by weight, from about 5% to about 30%, from about 10% to about 35%, or from about 15% to about 35% by weight of the cleaning composition, in its dried configuration. When such a composition is present on the abrasive fibers (e.g., within the contact layer), the contact layer maintains a substantially dry to the feel touch, even though water is present within the composition. The composition thus does not drip, sweat, weep, or otherwise leave the contact layer of the cleaning device absent the user causing the composition to be activated and released by wetting and/or scrubbing the contact layer against a surface to be cleaned. Rinse water may be added to the contact layer at the time of use, which will dilute the cleaning composition, causing a portion of it to be released during cleaning, e.g., typically foaming and sudsing during such release as it is agitated while scrubbing the surface with the contact layer. The entirety of the cleaning composition may not be released upon such a first use, but may allow the user to wet and use the cleaning article multiple times (e.g., 2-3 times before the cleaning composition is exhausted).

For example, the contact layer 102 may be of one color (e.g., white), while the cleaning composition is of a contrasting color (e.g., blue). This allows a user to easily see the dried cleaning composition on the contact layer, providing a readily visible indicator that the pad still retains cleaning composition therein. Such may be particularly helpful after one or more initial uses, as the presence of the contrasting color indicates to the user that the pad still has cleaning power remaining for use. Different colors could be provided for different contemplated uses (e.g., blue for kitchen use, green for bathroom use, etc.).

In an embodiment, the cleaning composition may consist of water and one or more surfactants. The amount of surfactant may range from about 10% to about 90%, from about 25% to about 90%, from about 30% to about 90%, from about 40% to about 80%, from about 50% to about 80%, or from about 60% to about 80% (e.g., about 70%) by weight of the cleaning composition, in its dried condition. The water may comprise up to about 40% by weight of the composition, more typically up to about 35%, or up to about 30% of the cleaning composition by weight, in its dried condition. As mentioned above, water may be included from about 1% to about 40% by weight, from about 5% to about 35%, from about 5% to about 30%, or from about 8% to about 20% (e.g., about 10-15%) by weight of the cleaning composition. In some embodiments, components other than water and surfactant may be included within the cleaning composition.

For example, an organic or mineral acid (e.g., to aid in cleaning) may be included. One or more of a chelating agent, an oxidizing agent (e.g., any peroxide, such as hydrogen peroxide), or a hypochlorite, (e.g., sodium hypochlorite), or one or more other adjuncts selected from the group consisting of fragrances, dyes, preservatives, humectants, solvents, polymers, pH adjusters, solubilizers, and combinations thereof may also be provided. Exemplary amounts of some optional components may include less than 5%, less than 4%, less than 3%, less than 2% (e.g., from 1% to 2%, or from greater than 0.5% to about 1.5%) of an acid; less than 3%, less than 2%, less than 1% (e.g., from about 0.5% to 1%) of a pH adjuster (e.g., a hydroxide); less than 1%, less than 0.5%, less than 0.3% (e.g., from about 0.01% to 0.5%) of a solubilizer (e.g., to solubilize a fragrance or other oil); less than 1%, or less than 0.5% of dye, fragrance, and/or preservative; or less than 10%, less than 5%, less than 4%, less than 3%, less than 2%, less than 1%, or less than 0.5% of any other optional adjuvant.

The surfactant(s) may include nonionic, anionic, cationic, ampholytic, amphoteric, zwitterionic surfactants, and mixtures thereof. A typical listing of anionic, ampholytic, and zwitterionic classes, and species of these surfactants, is given in U.S. Pat. No. 3,929,678 to Laughlin. A list of cationic surfactants is given in U.S. Pat. No. 4,259,217 to Murphy. Various alkyl polysaccharide surfactants are disclosed in U.S. Pat. No. 5,776,872 to Giret et al.; U.S. Pat. No. 5,883,059 to Furman et al.; U.S. Pat. No. 5,883,062 to Addison et al.; and U.S. Pat. No. 5,906,973 to Ouzounis et al. U.S. Pat. No. 4,565,647 to Llenado. Various nonionic surfactants can be found in U.S. Pat. No. 3,929,678 to Laughlin. Each of the above patents is incorporated by reference.

Any suitable surfactant(s) may be employed. Examples include, but are not limited to sulfates, sulfonates, betaines, alkyl polysaccharides, (e.g., alkyl polyglycosides ("APG"), also known as alkyl polyglucosides), alcohol ethoxylates, and combinations thereof. One or more of the selected surfactants may provide foam building characteristics.

By way of example, amine oxide chains may be provided with the one or more surfactants. For example, the surfactant(s) may include from 30% to 100% amine oxide components. Exemplary amine oxide chain lengths may include $C_8$ to $C_{16}$, e.g., $C_{12}$ and $C_{14}$. Sodium laurel sulfate (SLS) and sodium lauryl ether sulfate (SLES) are examples of suitable sulfate based amine oxide surfactants. APG chain length may be from $C_8$ to $C_{16}$, such as $C_8$ to $C_{14}$. Such chain lengths provide a good balance between hydrophobicity and hydrophilicity, creating a composition that can generate foam easily with minimal water, and which can also continue to generate foam under relatively high water conditions (e.g., as occurs when cleaning with rinse water). Various suitable APG surfactants are available from BASF under the tradename GLUCOPON (e.g., GLUCOPON 600). Various suitable SLS and SLES surfactants are available from STEPAN under the tradenames STEPANOL (e.g., STEPANOL WA EXTRA) and STEOL (e.g., STEOL CS 230). Various other surfactants available from these and other surfactant suppliers may be suitable for use.

In at least some embodiments, the cleaning composition may include polyacrylamide, methylcellulose, thickeners, or gums. In other embodiments of the invention, the cleaning composition may be free of polymers, thickeners and gums. The cleaning composition may initially have a consistency of a thick lotion, even without inclusion of gums or specific thickening components due to a relatively low water content, and relatively high surfactant and/or other actives content.

The composition may be acidic, neutral or basic. For an acidic composition, the pH will typically be about 2 to about 5 (about 2, about 3, about 4, about 5, or any range defined between any such values). For a neutral composition, the pH will typically be about 6 to about 8 (about 6, about 7, about 8, or any range defined between any such values). For a basic composition, the pH will typically be about 9 to about 13 (about 9, about 10, about 11, about 12, about 13, or any range defined between any such values). The pH, surfactant concentration, surfactant type, and concentration and/or presence of other components may be specifically configured to ensure that the composition is skin safe so as to not irritate the skin of a user as the user uses the cleaning article (e.g., scrubbing pad) to clean a tabletop, countertop, or the like. Such skin safety characteristics may be determined by any suitable test, such as by a standard repeat insult patch test (RIPT) test, an in vitro dermal irritancy test such as any of OECD 430, 431, 439, or other test for skin irritation.

The cleaning composition may be formulated initially with a water content that is higher than that which is provided within the finished manufactured cleaning article preloaded with cleaning composition. For example, the contact layer 102 may be dosed with an initial formulation (e.g., a "lotion"), and then dried, to evaporate away a portion of water initially present within the cleaning composition. For example, the water content of the initial composition may be higher than about 40%, e.g., about 50% to about 70% of the composition by weight. Similarly, the surfactant concentration of the initial composition may be lower than the 90% upper limit mentioned for the dried composition. For example, the surfactant concentration of the initial composition may be from about 10% to about 60% (e.g., about 30% to about 50%).

Once dosed into the contact layer 102, the cleaning composition may then be subjected to drying, so as to evaporate away a portion of the water present within the composition to yield the finished cleaning composition, which includes not more than about 40% water by weight, and so that the loaded contact layer exhibits dry to the touch hand-feel characteristics.

Because of the substantially dry characteristics, the multilayer cleaning article differs significantly from products commonly known as pre-wetted cleaning wipes, which are wet to the touch, sold or otherwise provided in a condition where the substrate of the article is soaked within a wet cleaning composition. The present articles on the other hand, are substantially dry, exhibiting a dry to the touch feel, only becoming wet to the touch upon wetting (e.g., by the user).

The manufacturing process may allow the initial formulation of the composition to have a lower viscosity than the finished cleaning composition, so as to facilitate easier dosing of the composition into the contact layer 102. For example, the viscosity of the initial formulation may be from about 1,000 centipoise to about 40,000 centipoise. After drying, the viscosity may increase as a result of the loss of water. The finished composition after drying may exhibit thickened characteristics, and when loaded within the contact layer, the combination of the dried cleaning composition and the contact layer exhibits dry to the touch characteristics.

An exemplary cleaning composition formulation, both before and after drying, is shown in Table 1 below. Because surfactants are often provided by the supplier in a form in which the active component is mixed with water (or other solvent), the table below shows the weight percent actives for each component, the weight percent actives in the initial formulation, and the weight percent of each component after drying.

TABLE 1

| Component | Raw Wt. % in Formulation | Wt. % Actives | Actual Wt % of Active | Wt. % Active After Drying |
|---|---|---|---|---|
| Water | | | 63 | 30 |
| Sodium Laurel Sulfate (SLS) | 40 | 30 | 12 | 23 |
| Sodium Lauryl Ether Sulfate (SLES) | 20 | 25 | 5 | 9 |
| Alkylpolyglucoside (APG) | 40 | 50 | 20 | 38 |

The cleaning composition may be effective at cleaning and removing soils and spills typically present on countertops, tabletops, and other hard surfaces. The composition may be effective in removal, even after such spills and soils have dried-on, e.g., adhering to the hard surface. The scrubby, abrasive characteristics of the contact layer are particularly helpful in such situations to aid the user in breaking up such dried-on soils and spills so that they can be cleaned away. Water may be added during the cleaning process to facilitate break-up and removal, e.g., added to the contact layer 102 or onto the hard surface, so as to mix with the cleaning composition already preloaded within the contact layer 102 before or during scrubbing. Such addition of water by the user also causes the cleaning composition to suds and foam (i.e., it is activated), which aids in providing cleaning action to the hard surface, and is desirable from an aesthetics perspective (e.g., consumers desire such sudsing, foaming action). The composition may be effective at cleaning and removing kitchen grease. In addition to cleaning tabletops and countertops (e.g., in the kitchen), other surfaces that may be cleaned may include, but are not limited to other countertops (e.g., in the bathroom), sinks, stovetops, dishes, floors, walls, doors, and the like.

The contact layer 102 may include silver ions or another antimicrobial agent provided therein, or such may be provided within the cleaning composition. An exemplary contact may comprise polyethylene terephthalate (PET) fibers. The contact layer 102 may include a blend of different fiber materials, and/or a blend of various denier fibers. Suitable contact layer materials may be available from Texel (Quebec, Canada), Filtrair (Heerenveen, Netherlands), Avintiv (Charlotte, N.C.), and other suppliers.

In addition to the contact layer 102, the cleaning article 100 also includes a gripping layer 104, which is differently configured from the contact layer 102. For example, the contact layer 102 is relatively abrasive, so as to be able to effectively scrub soils and spills, while the gripping layer 104 is more comfortably gripped by the hand of a user, exhibiting a much more soft, comfortable feel. In addition, the gripping layer may be specifically formulated to resist slipping out of or within the hands of a user, even if the gripping layer or the user's hand(s) are wet. The inventors have discovered that while synthetic fibers such as those employed for the contact layer 102, even where employed with different denier characteristics, etc. so as to be less abrasive and more comfortable in the hand, are not particularly well suited for gripping. Instead, such materials tend to slip out of the hand of the user, or to slip perhaps not fully out of the hand of the user, but within the hand, causing the user to lose their grip on the scrubbing pad 100.

The inventors have further discovered that by including a relatively high content of natural pulp fibers (e.g., natural cellulose from cotton or other natural sources) within the gripping layer, increased grip is provided within the hand of the user, so as to provide the user with the ability to provide adequate force transfer to the pad 100 when scrubbing soils or spills with the contact layer side of the pad, while minimizing any tendency of the gripping layer side to slip within the user's hand. For example, the inventors found that using purely synthetic materials or even regenerated cellulose resulted in a slippery hand-feel, and poor grip for scrubbing with the pad 100. In order to achieve sufficient grippability within the gripping layer so as to prevent, minimize, or reduce such slip, the inventors found that at least 40% by weight of pulp is needed within the gripping layer.

By way of example, pulp may be a lignocellulosic fibrous material, and may be provided by separating cellulose fibers from wood, waste paper (e.g., recycled paper), fiber crops (e.g., cotton), or other suitable sources. Such natural cellulose fiber material was found to improve grippability of the layer 104 when included within a mix or blend of other fibers (e.g., synthetic fibers) in an amount of at least 40% by weight. Exemplary other fibers for inclusion within the mixture of fibers within the gripping layer include synthetic fibers, such as those described herein for use in the contact layer 102. The denier of such synthetic fibers in layer 104 may differ from that of layer 102 (e.g., the denier may be lower, smaller diameter fibers), to provide more of a soft, non-abrasive feel as compared to the abrasive contact layer 102. Examples of materials that may be mixed with the natural pulp fibers in the gripping layer include, but are not limited to polypropylenes, polyethylene terephthalate, viscose, rayon, any of the other materials described as suitable for use within the contact layer, and any combinations or mixtures thereof. Binder(s) may be included within a blend of fiber materials, whether used for the gripping layer 104, or the contact layer 102. Both the contact layer 102 and the gripping layer 104 may be in the form of nonwoven fibrous layers. Specific (but non-limiting) exemplary gripping layer mixtures of materials are described in the Examples section below, which were tested as to their grippability.

By way of example, the pulp content of the gripping layer 104 may be at least 40% by weight, at least 42% by weight, at least 45% by weight, from 40% to about 60%, from 40% to about 55%, or from 40% to about 50% by weight of the gripping layer.

The gripping layer 104 is thus formed of a fibrous material, which has been found to provide for increased grippability, and a less slippery hand-feel. The gripping layer 104 is thus fibrous, as opposed to being of a sponge like structure, which is not fibrous, and which may tend to exhibit more of a slippery hand-feel, similar to purely synthetic fibrous materials, particularly when wetted during use.

The gripping layer 104 may also be characterized by particular coefficient of friction characteristics, which are higher for the gripping layer 104 including at least 40% by weight natural pulp fiber content as compared to layers formed with less pulp content, or purely synthetic fibers. For example, the gripping layer may have a mean coefficient of friction of at least 0.2, at least 0.22, at least 0.25, at least 0.27, or at least 0.3. Coefficient of friction may be no more than 0.9, no more than 0.8, no more than 0.75, no more than 0.7, no more than 0.65, no more than 0.6, no more than 0.55, no more than 0.5, or no more than 0.45. Ranges may be formed between any such values, and are contemplated to be within the scope of the present disclosure.

It will further be appreciated that the multilayer cleaning article (e.g., a pad) 100 including an abrasive contact layer 102 further exhibits higher coefficient of friction relative to the contact layer (e.g., between the contact layer and the hard surface being cleaned) as compared to where the contact layer 102 were sponge like, or otherwise less abrasive. Because of this relatively high coefficient of friction associated with the scratch, abrasive contact layer 102, it will be readily appreciated by those of skill in the art, in light of the present disclosure, that it may be important to provide a relatively high coefficient of friction relative to the gripping layer (e.g., between the gripping layer 104 and the user's hand), in order to allow the user to scrub the pad 100 over the surface to be cleaned without the gripping layer 104 slipping out of the user's hand, or slipping within the user's hand (e.g., losing grip).

The coefficient of friction of the gripping layer 104 can further be normalized for the user's particular hand size, using the property or parameter of "hand grip value". Hand grip value is equal to the coefficient of friction divided by the palm length squared, of the user. Such a property accounts for differences in measured coefficient of friction values associated with users (or testers) with larger hands. In testing, it was found that testers or users with larger hand sizes (e.g., particularly palm length) tended to achieve relatively higher coefficients of friction, as will be explained in further detail within the Examples section, below.

In addition to the contact layer 102 and the gripping layer 104, the multilayer cleaning article 100 may further include one or more additional layers, e.g., sandwiched between the contact layer 102 and the gripping layer 104. For example, in an embodiment, a thermoplastic film or other substantially moisture impermeable barrier layer 108 may be provided between contact layer 102 and gripping layer 104. Such a configuration is shown in the cross-section of FIG. 2. Such a thermoplastic film layer 108 may be thinner than contact layer 102, and gripping layer 104. For example, while the entire cleaning article may typically have a thickness from 1 mm to about 10 mm, about 1.5 mm to about 6 mm, or about 2 mm to about 6 mm, layer 108 may be the thinnest layer, e.g., typically from about 0.01 mm to about 0.25 mm. Such a layer may be provided to ensure that no liquid transfer occurs from one face (e.g., exposed face of contact layer 102) of the cleaning article 100 to the opposite face (e.g., exposed face of gripping layer 104). Such a layer may thus allow a user to apply water or other liquid to the contact layer 102, without the water migrating through the various layers, and into gripping layer 104. This also prevents the cleaning composition within the contact layer 102 from migrating through the thickness of the cleaning article, into the gripping layer 104, aiding to minimize contact of the cleaning composition with the hands of the user, which may also aid in maintaining the desired non-slip, grippable characteristics of the gripping layer 104.

By way of non-limiting example, the gripping layer 104 may have a thickness of about 0.25 mm to about 0.5 mm, the impermeable barrier layer 108 may have a thickness of about 0.05 mm, and the contact layer and an optional loft layer may make up the remainder of the thickness of the article 100. The contact layer 102 may have a thickness of about 0.5 mm to about 0.75 mm, and the loft layer may have a thickness of about 0.5 mm to about 0.75 mm.

Such a layer 108 may comprise any suitable moisture impermeable barrier layer, e.g., any thermoplastic material provided in the form of a thin film, so as to provide a barrier between layers 102 and 104. Examples include polyethylenes, polypropylenes, other polyolefins, any of the synthetic polymeric materials described as suitable for use in the fibers of the contact layer, and the like. Of course, such a film layer is in the form of a thin water impermeable film, rather than the fibrous (e.g., nonwoven) characteristics of layers 102 and 104.

Optionally, a loft layer 110 may be provided, as seen in FIG. 2. For example, such a loft layer may also be between layers 102 and 104. In the illustrated configuration, layer 110 is disposed adjacent to contact layer 102, sandwiched between barrier film layer 108 and contact layer 102, so that the cleaning composition may also reside therein. Because of the presence of barrier layer 108, the cleaning composition loaded within one face of the pad is not permitted to pass through to the opposite side (where the gripping layer 104 is disposed), staying on one side of barrier layer 108. Loft layer 110 may comprise a relatively soft, cushy, fluffy layer that exhibits greater compressibility than contact layer 102. Its characteristics may be such as to facilitate loading of the cleaning composition therein, as well as in contact layer 102. For example, it may have a pore size distribution and release profile that allows it to absorb and hold at least a portion of the cleaning composition therein, acting as a reservoir. Upon addition of water (e.g., at the time of use, for cleaning), and compression of loft layer 110 and/or layer 102, the cleaning composition may be released therefrom, being forced into contact layer 102 and into contact with the surface being cleaned.

The various layers of cleaning article 100 may be bonded to one another by any suitable process (e.g., sonically bonded, mechanically bonded, use of an adhesive, and the like).

Upon wetting with water, the dry to the touch contact layer 102 including the cleaning composition is activated, causing it to foam and form suds, which can be used in cleaning the desired surface. Because the cleaning composition is dried after loading, so as to have a very low water content, the rate of release of the cleaning composition is reduced as compared to what it would be if the cleaning composition were to include a higher water content. As a result, a longer usage period is possible with the cleaning article 100. For example, the cleaning article 100 can be wetted and used, then allowed to re-dry after use, and the cleaning article 100 will still retain sufficient cleaning composition therein to allow it to be wetted a second time, and used again. A consumer may typically get at least 2 or at least 3 such uses out of the cleaning article 100, before the cleaning composition preloaded therein has been rinsed out to the degree that it no longer noticeably foams and suds upon wetting. At such a point, the user may simply throw away the cleaning article depleted of cleaning composition.

IV. Examples and Testing Results

Exemplary gripping layers were tested for coefficient of friction and hand grip value characteristics. For each pad, structure and test methods were as follows:

Pad Description:

Each pad was a 4-layer pad, with the layers sonically bonded together. The abrasive contact layer was a PET needlepunch material from TEXEL The second layer was a loft "thruair" material. The third layer was a water impermeable thermoplastic barrier film layer, with the fourth layer being the tested gripping layer. Different types of gripping layers were tested, as described below. The contact layer face of the pad was dosed with 4 grams of cleaning composition, which initially had the consistency of a lotion, and which was dried so that the exposed face of the contact layer was dry to the touch. The composition of the cleaning composition was as shown in Table 1, above.

Test Method Description:

A. Pad Preparation:
(1) A cleaning pad has a surface contact side (the contact layer face) that has been pre-dosed with cleaning composition ("surface side") and a hand contact side with the gripping layer ("hand side") against which it is of interest to quantitate the degree of hand slip during cleaning.
(2) Cut a 6"×8¾" piece of the cleaning pad and soak in water for 30 seconds, using a sufficient amount of water in a sufficiently large vessel to fully submerge the pad. Poke with fingers to release stray air bubbles. Lift out by corners and let drain for 10 seconds.
(3) Place pad with "surface side" down on clean, wet, horizontal epoxy resin surface at least 13" wide and 13" long.
(4) Using fingers or hand with gentle pressure, move pad about 6-7" in a direction perpendicular to the long edge.
(5) Move the pad back to its original position, then repeat for three more strokes, for a total of five strokes.
(6) Flip the pad over, then move it just one stroke to pick up the suds.

B. Pad Assembly Preparation:
(1) The prepped pad is wrapped around a slab of thermoplastic material such as polyoxymethylene (e.g. white DELRIN®) that has been machined to have an overhang that allows the pad to be secured to it with binder clips in such a way that the binder clips are not supporting the weight of the pad assembly when it is placed on a flat surface.
   a. The slab has a rectangular overhang of length 7⅛", width 6½", and height ¼". This is connected to a rectangular support base of length 6⅛", width 5½", and height ⅜". The overhang is ½" on all sides.
   b. The rectangular support base has a slightly recessed surface on the bottom (about 1/16"), leaving a 1/16" inch wide lip around the base.
   c. Place the prepped pad with "hand side" up on top of the slab with the base down and long sides of the pad and slab aligned. Ends of the pad extend over the slab.
   d. Wrap ends of the pad around the overhang and secure with four ⅜" capacity binder clips (OFFICEMAX), using two per side with at least 4" between them. Make sure pad is flat and smooth (not bunched or wrinkled).
(2) Rinse and dry hands, to remove excess suds and start from the same condition.

C. Measurement:
(1) A Force Table (Model WO #8131, CVM) is a measuring apparatus that uses load-cells to measure horizontal and vertical forces applied to a countertop surface.
(2) Place the pad assembly with base down on a 12"×12" piece of non-skid mat (Home Legend Deluxe Non-Slip Safety Rug to Floor Gripper Pad, Model #RGD24, available at Home Depot) on top of the Force Table, with the longer dimension going from close to far (as opposed to left to right). The intent is to immobilize the pad on the Force Table so that the only sliding surfaces will be the "hand contact" side of the pad and the hand.
(3) Press down on pad assembly with palm of hand (fingers up and out of the way) until reaching a comfortable intermediate pressure that seems reasonable for consumer use. Vertical force displayed should be between 1 and 5 pounds, preferably between 2 and 4 pounds.
(4) Start recording data.
(5) Move palm horizontally along the pad in the away direction for a distance of about 3.5", and then back again, at a rate of 1 cycle (1 away stroke+1 toward stroke) per second, while maintaining a consistent peak vertical force close to the target. A metronome is advisable to maintain the proper speed.
(6) Continue for at least 35 seconds.
(7) With data collection still going, place a 2 pound weight on non-skid mat near pad assembly. Use a force gauge to push against the 2 pound weight with 1 pound of force (the weight should not move), both in the away direction and in the toward direction, holding for several seconds each time.

(8) Stop data collection.

(9) Undo binder clips and remove pad. Rinse well so as not to carry suds over to the next run: pad-soaking vessel, suds-activating surface, thermoplastic slab, binder clips, non-skid mat, and Force Table surface. Dry non-skid mat and Force Table surface.

(10) Repeat for additional samples.

D. Data Analysis:

(1) The data output from the Force Table yields six columns of numbers: time in seconds, vertical (i.e., downward) force in pounds, and force in pounds for each of the four lateral directions: toward, away, left, and right. For the current method, only vertical, away, and toward forces are used.

(2) Plot vertical, away, and toward forces as a function of time. If the baselines (when no force is applied) are at zero, and the values at the end of the file (e.g., data set) are consistent with the calibration weights (2 pounds for vertical, 1 pound for away and toward), then no scaling adjustment is necessary and the next step can be skipped.

(3) Adjust scaling of the three force columns to calibrate to forces at end of file. This involves finding a slope and offset for the vertical, away, and toward columns that reproduces the 2 pound and 1 pound calibration forces at the end of the files.

a. For each of the three force columns, the quantities involved in determining the slope and offset are:
  i. BL=measured baseline (determined from a region in which no force is applied)
  ii. Adjusted baseline=0
  iii. CF=measured calibration force (determined from a region with the calibration weight/force constantly applied)
  iv. Adjusted calibration force=2 pounds for vertical and 1 pound for away or towards b. Calculation of adjusted force
  i. Adjusted vertical force=2*(vertical force−$BL_v$)/($CF_v$−$BL_v$)
  ii. Adjusted away force=(away force−$BL_a$)/($CF_a$−$BL_a$)
  iii. Adjusted toward force=(toward force−$BL_t$)/($CF_t$−$BL_t$)

c. The slopes and offsets should be similar over a set of samples and an average may be used for scaling. For the data reported in Table 2:
  i. Scaled vertical force=(vertical force−1.25)*1.1
  ii. Scaled away force=(away force+0.14)*1.5
  iii. Scaled toward force=(toward force−0.55)*1.4

(4) On the plot of (adjusted) vertical, away, and toward forces as a function of time, disregard initial region in which no force is applied, and first 20 seconds of motion data (still priming). Use the next 10 seconds of data to proceed with analysis.

(5) Calculation of friction coefficient.
  a. Discard (adjusted) away force values under 0.2 pounds. This should leave about 10 plateaus of approximately 0.5 seconds each with a few points dropping off on either side.
  b. Discard 10 points (equivalent of 0.1 sec) on either side of each plateau, to remove edge effects associated with stroke reversal.
  c. Repeat for (adjusted) toward force.
  d. Divide remaining (adjusted) away and (adjusted) toward force data points by corresponding (adjusted) vertical force data points to obtain away and toward friction coefficients associated with middle of plateaus.
  e. Calculate the mean away and toward friction coefficients over the 10 seconds, and average the two values to yield the friction coefficient. Due to natural body mechanics, the vertical force on the away strokes may be somewhat higher than on the toward strokes, which results in a bias of the away friction coefficients being lower than the towards friction coefficients.

(6) To account for bias in the friction coefficient due to hand physiology, a more consistent, normalized, measure of a material's grippability is its friction coefficient relative to a tester's hand size, which normalization does not require a reference substrate. Here we define a parameter, "hand grip", equal to the friction coefficient divided by the square of palm length (e.g., in inches).

Friction coefficient results from tested gripping layer materials were as shown below in Table 2.

TABLE 2

| | | Friction coefficients | | | |
| --- | --- | --- | --- | --- | --- |
| Substrate | Composition | Judge #1 | Judge #2 | Judge #3 | Mean value |
| A | Rayon/PET | 0.230 | N/A | N/A | |
| B | PET (Reference) | 0.265 | 0.215 | 0.380 | 0.29 |
| C | Over 40% Pulp, PET, Viscose, Binder blend | 0.335 | 0.310 | 0.415 | 0.35 |
| D | PET Viscose | 0.285 | 0.290 | 0.375 | 0.32 |
| E | Pulp 70%/ PET Bico | 0.560 | 0.600 | 0.750 | 0.64 |
| F | PP/Pulp 20% | 0.175 | 0.245 | 0.355 | 0.26 |
| G | PP/Pulp 30% | 0.245 | N/A | N/A | |
| H | PP/Pulp 40% | 0.370 | N/A | N/A | |

It was noted that friction coefficient increases with increasing pulp content.

E. Statistics Data:

To verify reproducibility, five of the substrates (B-F) were evaluated by two additional judges. Key comparisons are made using paired t-test at 90% confidence interval (to eliminate judge bias) to demonstrate that test substrate C, with over 40% pulp, PET, Viscose, and binder blend has statistically significantly higher friction coefficient than substrate B (the PET reference). Similarly, test substrate E has the highest friction coefficient with 70% pulp. T-test analysis (also at 90% confidence interval) also confirms that substrate C has statistically significantly higher friction coefficient than substrate D.

Figure 4:
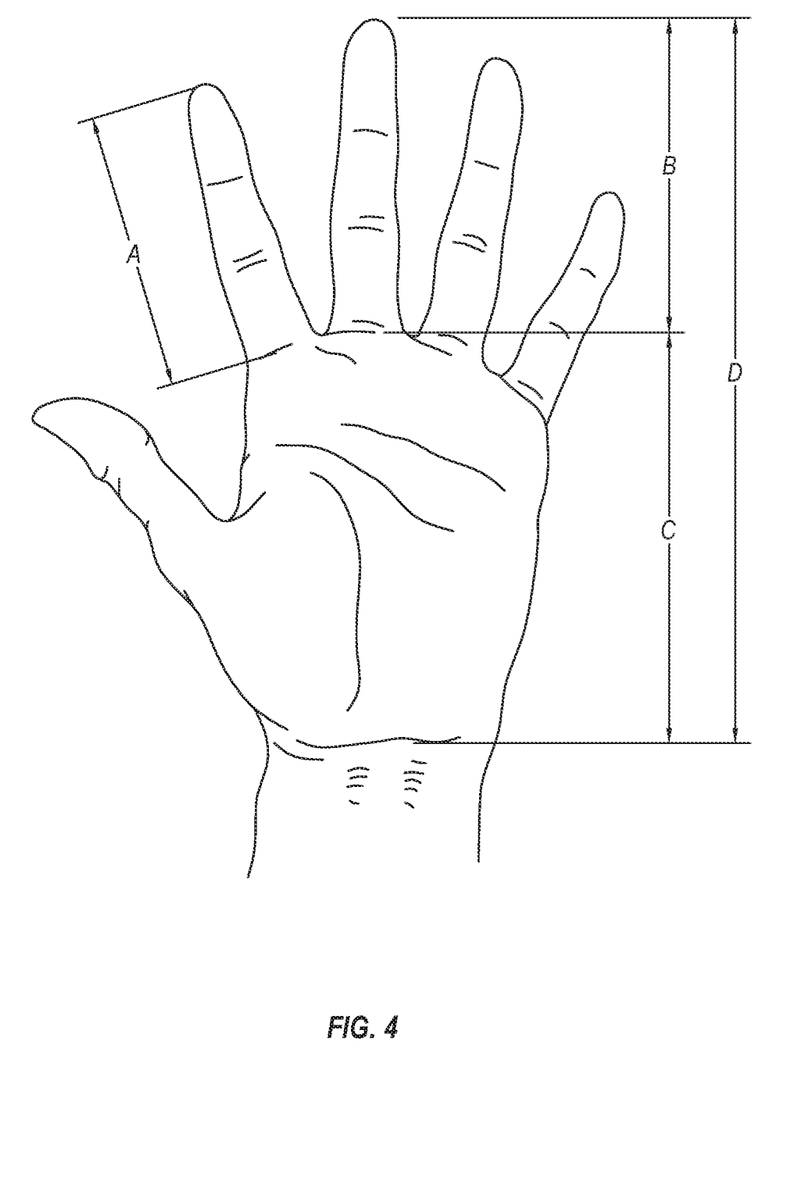
FIG. 4 shows a hand of a user, denoting index finger length, middle finger length, palm length, and hand length measurements, as used to determine hand grip value.

Hand grip values as described herein are calculated for the 3 judges (or testers) based on hand size dimensions of the judges, as shown below in Table 3, and in reference to FIG. 4, which illustrates the measured dimensions.

TABLE 3

| | Judge #1 | Judge #2 | Judge #3 |
| --- | --- | --- | --- |
| index finger length (A) | 2.8 in | 2.5 in | 3.125 in |
| middle finger length (B) | 2.9 in | 2.7 in | 3.75 in |
| hand length (D) | 6.7 in | 6.4 in | 8 in |
| Palm length (C) | 3.80 in | 3.70 in | 4.25 in |

As described above, friction coefficient values are converted to hand grip values by dividing the friction coefficient by the square of the judge's palm length. The results of hand grip are shown in Table 4, below.

TABLE 4

| | | Hand grip (1/in$^2$) | | | |
|---|---|---|---|---|---|
| Substrate | Composition | Judge #1 (DF) | Judge #2 (EC) | Judge #3 (BO) | Mean value |
| A | Rayon/PET | 0.0159 | N/A | N/A | |
| B | PET | 0.0184 | 0.0157 | 0.0210 | 0.018 |
| C | Over 40% pulp, PET, Viscose, Binder blend | 0.0232 | 0.0226 | 0.0230 | 0.023 |
| D | PET Viscose | 0.0197 | 0.0212 | 0.0208 | 0.021 |
| E | Pulp/PET Bico | 0.0388 | 0.0438 | 0.0415 | 0.041 |
| F | PP/Pulp 20% | 0.0121 | 0.0179 | 0.0197 | 0.017 |
| G | PP/Pulp 30% | 0.0170 | N/A | N/A | |
| H | PP/Pulp 40% | 0.0256 | N/A | N/A | |

Figure 3:
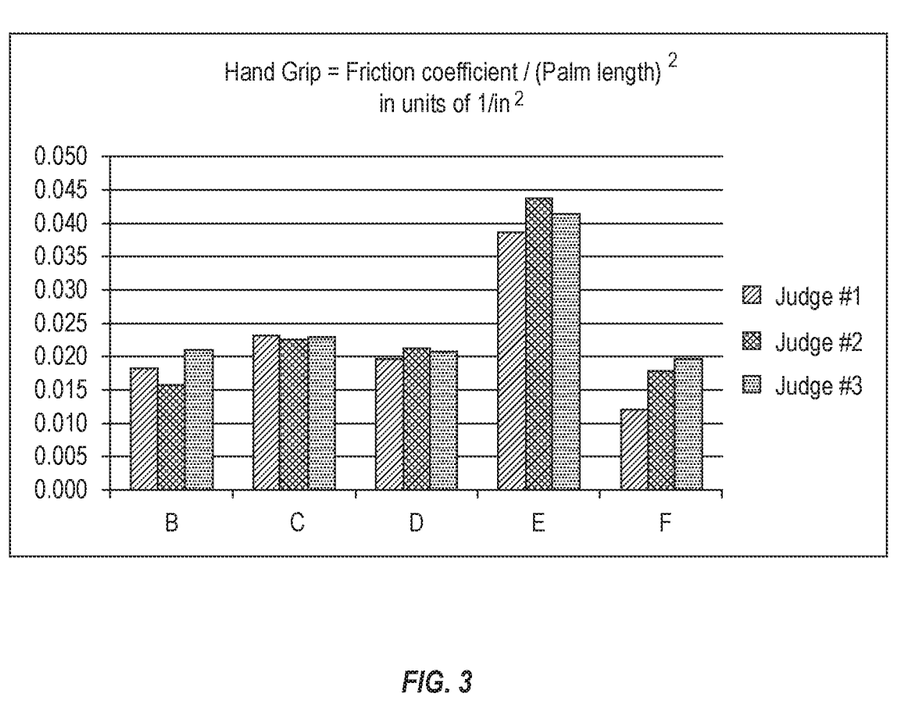
FIG. 3 is bar chart showing hand grip values for tested comparative and exemplary multilayer cleaning articles.

FIG. 3 also plots the hand grip data for the different judges for the 5 substrates (substrates B-F) that were tested by multiple judges. As seen in Table 4 and FIG. 3, the parameter of hand grip minimizes bias that might otherwise be present due to differences in hand size between the different judges, or users.

A t-test on the parameter hand grip produces the same statistical outcomes, showing that there is a statistically significant difference in the grippability of substrate C and E over reference substrate B as well as substrate D. Substrates C, E, and H are examples of gripping layer materials including at least 40% pulp, and that exhibited hand grip values of at least 0.015 (1/in$^2$), preferably at least 0.02 (1/in$^2$), or at least 0.022 (1/in$^2$).

Coefficient of friction (and hand grip) is particularly important in thin multilayer cleaning articles, where compression does not significantly improve grip by providing vertical surfaces for force transfer or gripping. For example, all tested pads were under 6 mm in thickness. At such thicknesses, there is little to no gain in grippability due to the ability to compress the pad, or grip the sides of the pad, as the pad is so thin, being nearly 2-dimensional. The pad thicknesses were as shown below in Table 5.

TABLE 5

| Substrate | Overall Pad thickness (mm) |
|---|---|
| A | 3.89 |
| B | 4.46 |
| C | 3.45 |
| D | 3.90 |
| E | 4.01 |
| F | 3.96 |
| G | 3.75 |
| H | 4.02 |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A multilayer cleaning article comprising: (a) a substantially dry surface contact layer comprising: a cleaning composition loaded onto the surface contact layer, the cleaning composition comprising: about 10% to about 90% by weight of surfactant; and about 0.01% to about 2% by weight of fragrance; (b) a gripping layer comprising: at least 40% by weight of pulp fibers; and (c) a barrier layer positioned between the surface contact layer and gripping layer so that the cleaning composition does not migrate from the surface contact layer into the gripping layer and the gripping layer remains substantially dry.

2. The cleaning article of claim 1, wherein the cleaning composition further comprises an acid.

3. The cleaning article of claim 1, wherein a major face of the surface contact layer comprises a pattern.

4. The cleaning article of claim 1 wherein the cleaning composition further comprises a chelating agent.

5. The cleaning article of claim 1 wherein the cleaning composition comprises an alkyl polyglucoside surfactant.

6. The cleaning article of claim 1 wherein the cleaning composition comprises 1% to 40% by weight of water.

7. The cleaning article of claim 1 wherein one or more layers of the multilayer cleaning article are sonically bonded together.

8. The cleaning article of claim 1 further comprising a loft layer adjacent to said barrier layer.

9. The cleaning article of claim 1 wherein a thickness of all the layers of the multilayer cleaning article measured together is between about 2 mm and 6 mm.

10. The cleaning article of claim 1 wherein the gripping layer has a mean coefficient of friction of at least 0.2.

11. A multilayer cleaning article comprising: (a) a substantially dry surface contact layer comprising: a. a face of the surface contact layer comprises a pattern; and b. a cleaning composition loaded onto the surface contact layer, the cleaning composition comprising: about 10% to about 90% by weight of surfactant; i. about 0.01% to about 2% by weight of fragrance; and ii. an adjunct selected from one or more of: a dye, a preservative, a solvent, a humectant, a pH adjuster, a chelating agent, an oxidizing agent, or a polymer; (b) a moisture impermeable barrier layer positioned between the surface contact layer and gripping layer so that the cleaning composition does not migrate from the surface contact layer into the gripping layer; and (c) a substantially dry gripping layer comprising: at least 40% by weight of pulp fibers;

and wherein the contact layer is of one color while the cleaning composition is of a contrasting color, to allow a user to see the dried cleaning composition on the contact layer, providing a visual indicator that the contact layer retains cleaning composition therein.

12. The cleaning article of claim 11 wherein the cleaning composition comprises a sulfate surfactant.

13. The cleaning article of claim 11 wherein the cleaning composition comprises an alkyl polyglucoside surfactant.

14. The cleaning article of claim 11 wherein the cleaning composition comprises 1% to 40% by weight of water.

15. The cleaning article of claim 11 wherein the cleaning composition comprises an acid.

16. The cleaning article of claim 11 wherein a thickness of all the layers of the multilayer cleaning article measured together is between about 2 mm and 6 mm.

17. The cleaning article of claim 11 wherein the gripping layer has a mean coefficient of friction of at least 0.2.

18. A multilayer cleaning article consisting of:
(a) a substantially dry surface contact layer comprising:
  a. a patterned face of the surface contact layer; and
  b. a hard surface cleaning composition comprising:
    i. about 10% to about 90% by weight of surfactant;
    ii. about 0.01% to about 2% by weight of fragrance; and
    iii. an acid; and
(b) a barrier layer adjacent to a substantially dry gripping layer preventing the cleaning composition from migrating from the surface contact layer into the gripping layer and allowing the gripping layer to remain substantially dry even when the surface contact layer is wet;

(c) optionally, a loft layer; and (d) a substantially dry gripping layer comprising:
at least 40% by weight of pulp fibers;

wherein the contact layer is of one color while the cleaning composition is of a contrasting color, to allow a user to see the dried cleaning composition on the contact layer, providing a visual indicator that the contact layer retains cleaning composition therein.

19. The cleaning article of claim 18 wherein a thickness of all the layers of the multilayer cleaning article measured together is between about 2 mm and 6 mm.

20. The cleaning article of claim 18 wherein the gripping layer has a mean coefficient of friction of at least 0.2.

* * * * *